UNITED STATES PATENT OFFICE.

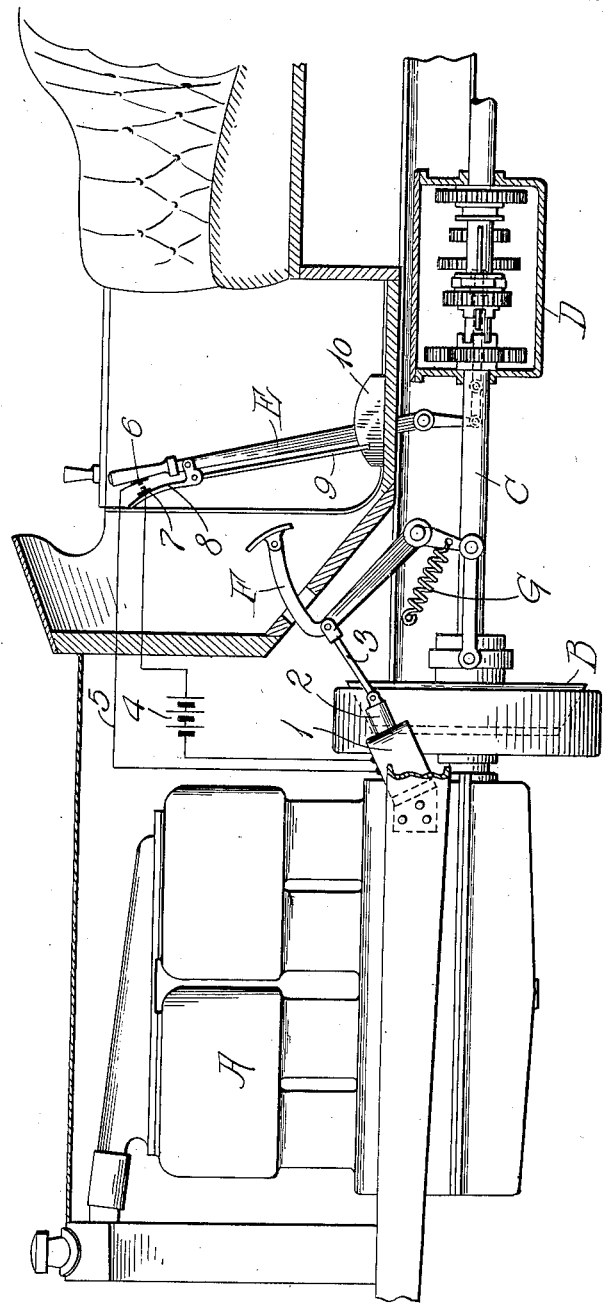

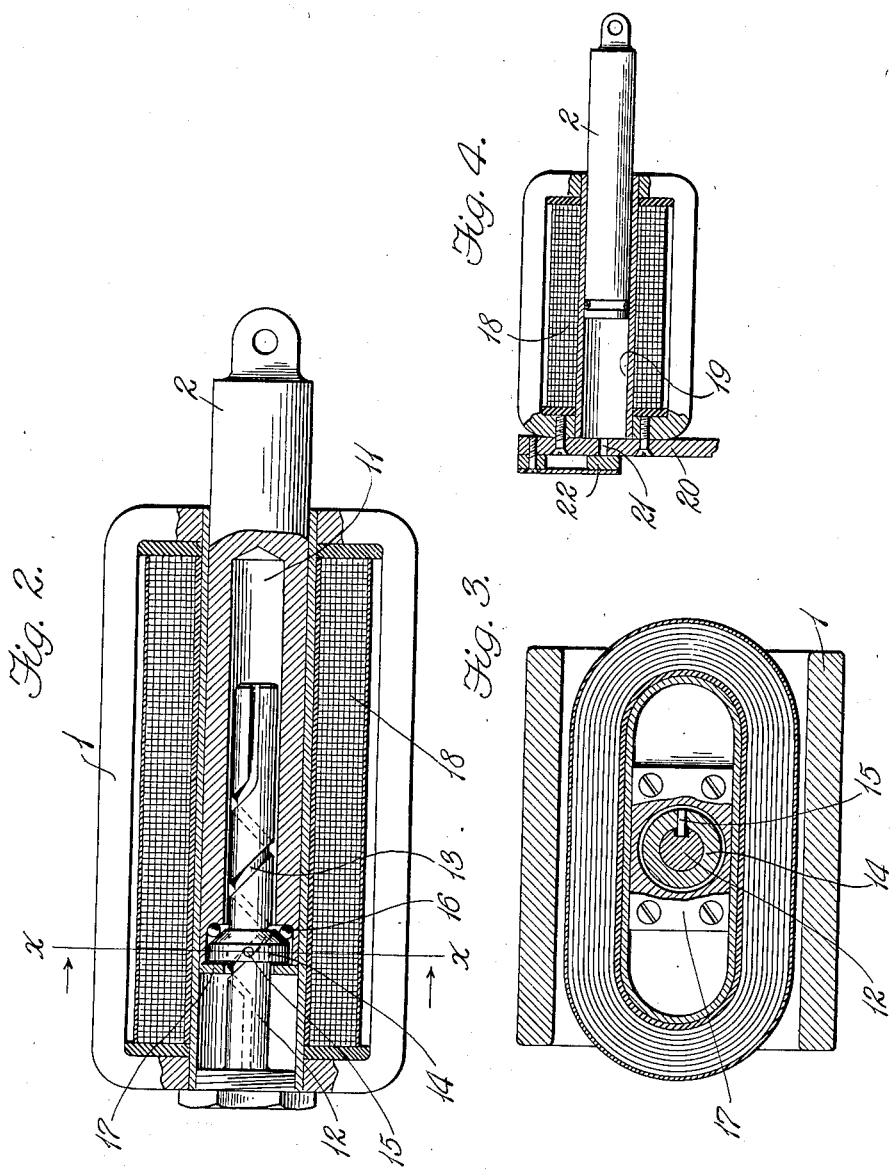

RICHARD E. DRACHENBERG, OF DETROIT, MICHIGAN.

CLUTCH-CONTROLLING MECHANISM FOR MOTOR-VEHICLES.

1,177,765.	Specification of Letters Patent.	Patented Apr. 4, 1916.

Application filed June 19, 1913. Serial No. 774,510.

*To all whom it may concern:*

Be it known that I, RICHARD E. DRACHENBERG, a citizen of the United States of America, residing at Detroit, in the county of Wayne and State of Michigan, have invented certain new and useful Improvements in Clutch-Controlling Mechanism for Motor-Vehicles, of which the following is a specification, reference being had therein to the accompanying drawings.

This invention relates to clutch operating mechanism especially adapted for use in automobile construction and its object is to provide suitable mechanism adapted to operate in conjunction with the clutch and change speed mechanism of a motor vehicle power transmitting mechanism to automatically disconnect the clutch upon the shifting of the gears of the change speed mechanism and to retard the reëngagement of the clutch.

A further object of the invention is to provide certain new and useful features in the construction and arrangement of parts especially adapting the same for use in motor vehicle construction.

To these ends the invention consists in the matters hereinafter set forth and more particularly pointed out in the appended claims reference being had to the accompanying drawings in which—

Figure 1 is a sectional view of the forward part of an automobile showing mechanism embodying the invention in operative position thereon; Fig. 2 is an enlarged longitudinal section through an electromagnet embodying features of the invention; Fig. 3 is a transverse section of Fig. 2 on the line *x—x*; and Fig. 4 is a longitudinal section through a modified form of electromagnet.

For convenience of illustration, a common form of motor vehicle construction is shown in the drawings in which the power is transmitted from the gasolene motor A by means of a fly wheel clutch B to a shaft C extending rearwardly to the casing D in which change speed gearing is mounted, the gears of which are shifted to give the changes in speed by means of a suitable hand lever E. The clutch B is also usually operated by means of a foot pedal F and this pedal is actuated by means of a heavy spring G which tends to normally hold the clutch in engaged or operative position. Obviously any suitable form and arrangement of clutch, change speed mechanism and means for operating the same may be employed and these devices form *per se* no part of this invention.

In the operation of the motor vehicle having the usual clutch and sliding gear transmission mechanism, it is necessary for the operator to throw out the clutch by pressing upon the foot pedal whenever he wishes to shift the gears of the change speed mechanism as otherwise when the shifting gear came into mesh with its companion gear there would be great liability of stripping the teeth of the gears, as the full power of the motor would be driving one of the gears.

An object of this invention is to obviate the necessity for throwing out the clutch by means of the foot pedal every time the gears of the change speed mechanism are shifted, and to accomplish the disconnecting of the clutch automatically whenever the gears are shifted, a suitable electromagnet 1 is suitably positioned forwardly of the foot pedal F with its movable core 2 connected to the pedal by means of a link 3. This electromagnet is energized by any suitable source of electricity such as a battery 4 placed within an electrical circuit 5, one terminal of which is connected to a contact 6 placed upon the handle of the lever E and the other terminal connected to a contact 7 upon the grip lever 8 which operates the usual dog 9 engaging the sector 10 for holding the lever in the position to which it is adjusted.

When the operator grasps the lever E to shift the gears he releases the lever by pressing the grip toward the handle and this brings the contacts 6 and 7 together closing the circuit 5 and energizing the electromagnet which when energized, draws its core into its coil and thus moves the foot pedal F, which in turn draws the clutch out of operative position and disconnects the engine from the change speed mechanism.

As soon as the gears have been shifted by the lever E and the operator releases the latch lever 8, the circuit will be broken and the magnet will be deënergized. The spring G will then at once act to throw the clutch in turning the foot pedal which, by reason of its link connection with the core of the magnet, will draw the core outwardly. As the spring which holds the clutch in must be sufficiently strong to hold the parts in firm frictional engagement, said spring will at once act to quickly throw the clutch and this sudden application of the power of the engine to the driving mechanism would be liable to break the gears or stall the engine, and it is therefore desirable to provide means for retarding the reëngagement of the clutch. This retarding is accomplished within the electomagnet by forming a longitudinal bore 11 in its core 2 and supporting in any suitable manner a shaft 12 in position to enter the open end of this bore. This shaft is formed with a spiral groove 13 throughout its length and within a recess in the end of the core member is a collar 14 running free upon the shaft and provided with a pin 15 or other projection engaging the spiral groove in the shaft. Interposed between one side of the collar and the bottom of the recess in the end of the core are anti-friction balls 16 and secured to the end of the core over the recess therein is a plate 17.

When the core is drawn into the coil 18 of the electromagnet by the energizing thereof, the collar 14 will run against the balls and turn freely upon the shaft 12, offering little resistance to the inward movement of the core. When the core is pulled out by the spring G after the magnet has been deënergized, the collar 14 will be forced into frictional engagement with the plate 17 which will thus frictionally retard the turning of the collar and the outward movement of the core. The throwing in of the clutch will thus be retarded by the action of the collar 14 and the clutch will therefore be gradually brought to its seat by the spring G.

In the construction of electromagnet shown in Fig. 4, the core 2 fits closely within a sleeve 19 in the center of the coil 18 and the end of this sleeve is tightly closed by a plate 20 having an opening 21 therein to permit the escape of the air which is trapped within the inner end of the sleeve between the end of the core and the plate. This opening is closed by a valve 22 seating upon the outer face of the plate so that upon the inward movement of the core it will be forced from its seat and permit the air to freely escape so that the air will offer little resistance to the inward movement of the core. Upon the outward movement of the core when the magnet is deënergized and the clutch is about to be reëngaged by the action of the spring G, the valve 22 will seat over the opening but not so tightly as to exclude the air entirely from the inner end of the sleeve but will permit the air to gradually leak in, thus retarding the outward movement of the core and the seating of the clutch.

Obviously, changes may be made in the construction and arrangement of parts without departing from the spirit of my invention and I do not therefore limit myself to the form or arrangement shown.

Having thus fully described my invention what I claim is:—

1. In a motor vehicle, the combination of an engine, a transmission mechanism, a clutch, manually operable means for operating the clutch, and an electrically controlled device for operating the clutch operable with said mechanism.

2. In a motor vehicle, the combination of an engine, power transmitting mechanism, a clutch for connecting the engine and said mechanism, electrical means including an electrical circuit for operating said clutch, means for operating said mechanism, and means in said circuit operable with said last named means for controlling the operation of said electrical means.

3. In a motor vehicle, the combination of an engine, a change speed mechanism, a clutch, an operating device for said mechanism, electrically controlled means including an electrical circuit for operating said clutch, and means operable with said device for controlling said circuit.

4. In a motor vehicle, the combination of an engine, a power transmitting mechanism, a clutch, and electrical means for operating said clutch operable with the operation of said mechanism to change the speed.

5. In a motor vehicle, an engine, a power transmitting mechanism, and electrical means including a solenoid adapted to be energized for disconnecting the engine and power transmitting mechanism upon the release of and prior to the operation of said mechanism to change the speed of the vehicle.

6. In a motor vehicle, the combination of an engine, power transmitting mechanism, a clutch, manually operable means for operating the clutch, an electrically controlled device for operating the clutch, said device operating to cause the disconnection of the clutch, and means for retarding the reëngagement of the clutch.

7. In a motor vehicle, the combination of an engine, a transmission mechanism, a clutch, means for yieldingly holding the clutch engaged, an electrically controlled device for operating the clutch to disengage the same, means for operating said device in timed relation to said mechanism, and means for retarding the action of the yielding means in reëngaging the clutch.

8. In a motor vehicle, the combination of an engine, transmission mechanism, a clutch, a spring for normally holding the clutch engaged, manually operable means for moving the clutch against the action of the spring, an electro-magnet for moving the clutch against the action of the spring, in timed relation to the operation of said mechanism, and means for retarding the action of the spring in reëngaging the clutch.

9. In a motor vehicle, the combination of an engine, transmission mechanism, a clutch, a spring for normally holding the clutch engaged, a lever for moving the clutch against the action of the spring to disengage the clutch, means for operating the transmission mechanism, an electromagnet connected to said lever to operate the same against the action of the spring, said electromagnet including a movable core, and means for retarding the movement of the core in one direction to retard the reengagement of the clutch.

10. In a motor vehicle, the combination of an engine, transmission mechanism, a clutch, a spring for normally holding the clutch engaged, means for operating said mechanism, a foot pedal for moving the clutch into disengaged position against the action of said spring, an electromagnet having a longitudinally movable core operatively connected to the foot pedal to actuate the same against the action of said spring when said core is moved in one direction by electrical energy, means for retarding the movement of the core in the opposite direction to retard the reëngagement of the clutch, and means for energizing the magnet in timed relation to the operation of the transmission mechanism.

11. In a motor vehicle, the combination of an engine, transmission mechanism, a clutch, a spring to normally hold the clutch in engaged position, a foot lever to actuate the clutch against the action of the spring, an electromagnet having a longitudinally movable core formed with a longitudinal bore in one end, a link connecting the opposite end of the core and the foot pedal, a rod rigidly supported and adapted to engage the bore and formed with a spiral groove, means carried by the core adapted to be turned by engagement with the groove and to frictionally resist outward movement of the core, an electric circuit for the magnet, and controlling means in the circuit operable in timed relation to the transmission mechanism.

12. In a motor vehicle, the combination of an engine, transmission mechanism, means for operating said mechanism, a spring to hold the clutch engaged, a foot pedal to operate the clutch against the action of the spring, an electro-magnet having a longitudinally movable core formed with a longitudinal bore in one end, a rod connecting the opposite end of the core with the foot pedal, a rod rigidly supported in alinement with the core to enter the bore thereof, said rod being formed with a spiral groove, a collar mounted upon the rod and having means engaging the groove, antifriction means between the collar and core at one side, and a friction member on the core to engage the opposite side of the collar, an electrical circuit for the electromagnet, and means for closing the circuit.

13. In a motor vehicle, an engine, a transmission mechanism, a clutch between the engine and transmission mechanism, a gear shift lever, power operated means for disengaging said clutch, and means on the gear shift lever for controlling said power operated means.

14. In a motor vehicle, an engine, a transmission mechanism, including gears, a clutch between the engine and transmission mechanism, a gear shift lever, power operated means for disengaging said clutch and means for preventing the shifting of the transmission gears before the clutch is disengaged.

15. In a motor vehicle, an engine, a transmission mechanism, a clutch between the engine and transmission mechanism, a gear shift lever, power operated means for releasing said clutch, a device for controlling said power operated means, means for locking the gear shift lever in position, and means for simultaneously operating said control device to disengage said clutch and release said locking means.

16. In a motor vehicle, an engine, a transmission mechanism, a clutch between the engine and transmission mechanism, a gear shift lever, power operated means for releasing said clutch, a device for controlling said power operated means, means for locking said gear shift lever in position, and means on said lever for operating said controlling device and locking means.

17. In a motor vehicle, an engine, a transmission mechanism, a clutch between the engine and transmission mechanism, a gear shift lever, means for preventing the operation of the lever while the clutch is engaged, power operated means for disengaging said clutch, and means for controlling said power operated means.

18. In a motor vehicle, an engine, a transmission mechanism, a clutch between the engine and transmission mechanism, a gear shift lever, means for locking said lever in position, power operated means for disengaging said clutch, and means operated by the unlocking movement of said lever locking means for controlling said power operated means.

In testimony whereof I affix my signature in presence of two witnesses.

RICHARD E. DRACHENBERG.

Witnesses:
  LEWIS E. FLANDERS,
  ANNA M. DORR.